Aug. 8, 1933.   A. J. BEHLING   1,921,650
PICKING MACHINE
Original Filed April 7, 1928   3 Sheets-Sheet 1
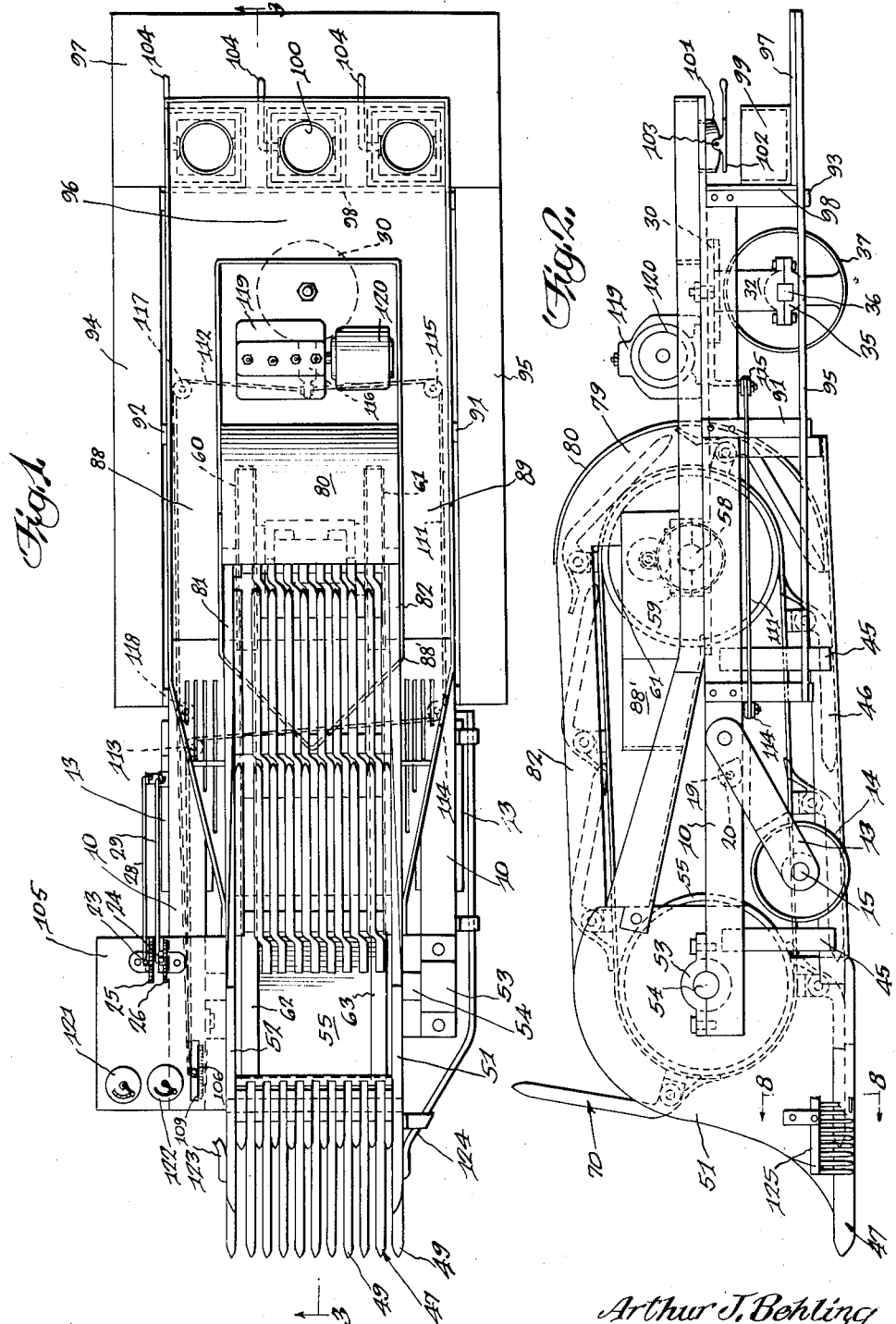
Arthur J. Behling
INVENTOR
BY Victor J. Evans
ATTORNEY Aug. 8, 1933.     A. J. BEHLING     1,921,650
PICKING MACHINE
Original Filed April 7, 1928     3 Sheets-Sheet 2
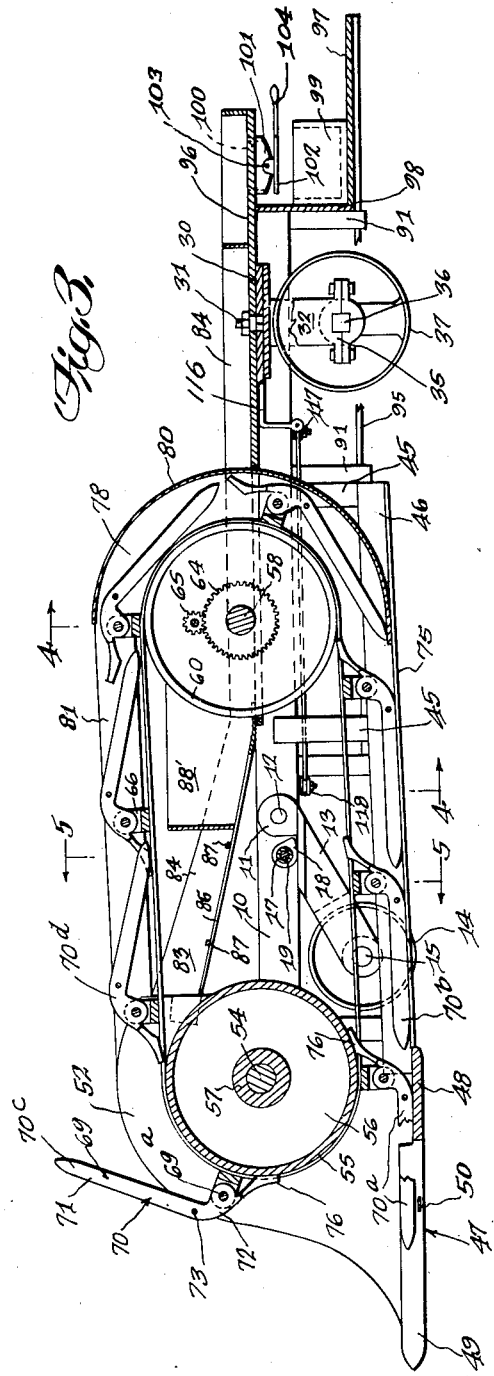
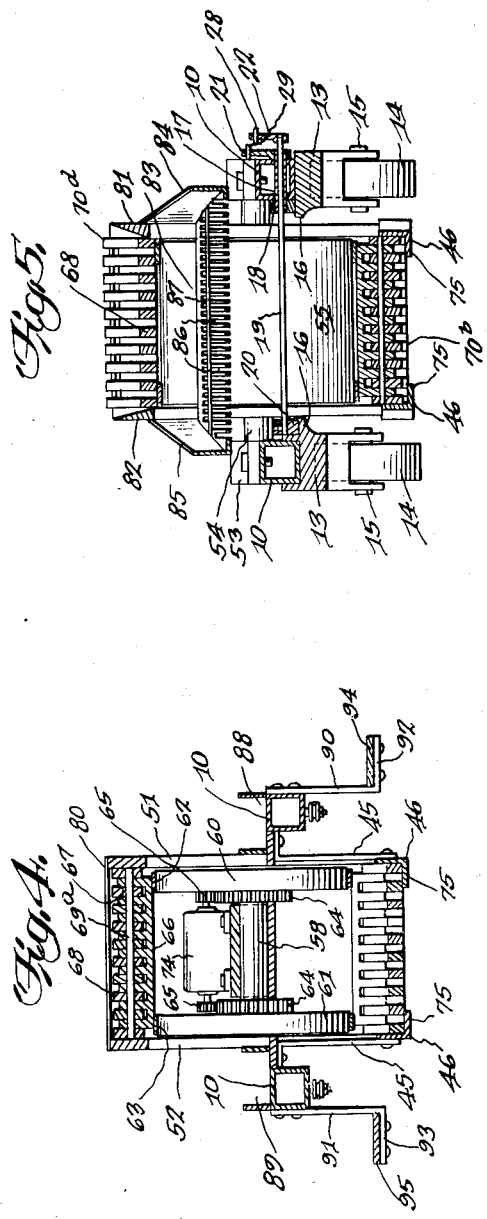
Arthur J. Behling
INVENTOR
BY Victor J. Evans
ATTORNEY Aug. 8, 1933.   A. J. BEHLING   1,921,650
PICKING MACHINE
Original Filed April 7, 1928   3 Sheets-Sheet 3
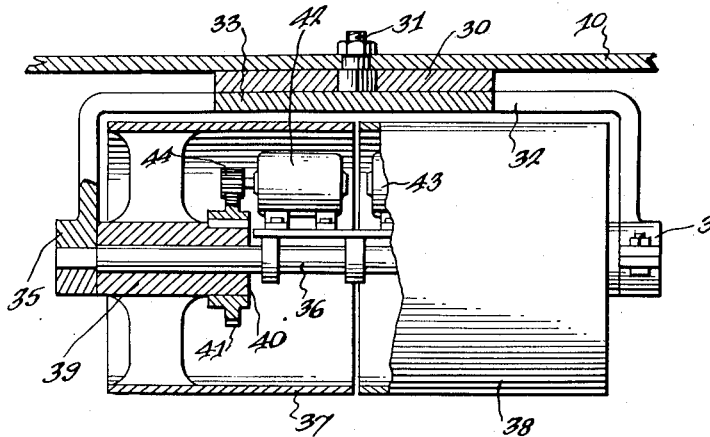
Fig.6.
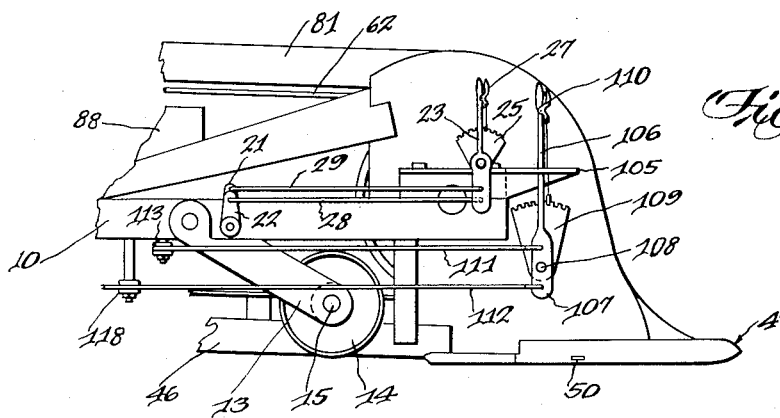
Fig.7.
Fig.8.
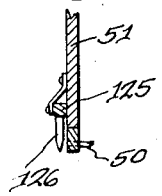
Fig.9.
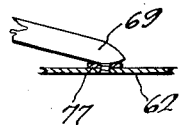
Arthur J. Behling
INVENTOR
BY Victor J. Evans
ATTORNEY Patented Aug. 8, 1933

1,921,650

UNITED STATES PATENT OFFICE 1,921,650

PICKING MACHINE

Arthur J. Behling, Chicago, Ill., assignor, by direct and mesne assignments, to Pioneer Fruit Harvesting Company, a Corporation of Minnesota Application April 7, 1928, Serial No. 268,195
Renewed April 11, 1932

13 Claims. (Cl. 56—327)

This invention relates to certain novel improvements in picking machines, and has for its principal object the provision of an improved construction of this character which will be highly efficient in use and economical in manufacture.

It is an object of my invention to provide a picking machine which will be particularly adapted for picking fruit and the like from the ground and is particularly adapted for the picking of prune plums, walnuts and other objects which are permitted to fall from the trees on which they are grown onto the ground before being collected for marketing and distribution.

It is another object of my invention to provide a picking machine of the foregoing character which will be arranged in such a manner that it will pick the fruit or the like from the ground without injuring the same.

A further object of the invention, ancillary to the foregoing, is to provide a picking arrangement which will include stationary members adapted to travel slightly below the surface of the ground and which will be arranged such that movable members may pass therebetween and collect fruit or the like and carry it up into the machine.

Another object of the invention is to provide a machine of the foregoing character which will be of relatively restricted height in order to facilitate the passage thereof under trees and the like.

A still further object of the invention is to provide a machine which will embody a plurality of controls whereby the machine may be arranged to operate at various speeds and over uneven ground and the like.

A still further object of the invention is to arrange a machine of the foregoing character in such a manner that the fruit or the like picked up thereby may be inspected before passage into receiving boxes or the like.

Other objects will appear hereinafter.

The invention consists in the novel combination and arrangement of parts to be hereinafter described and claimed.

The invention will be best understood by reference to the accompanying drawings, wherein a preferred form of construction is shown, and in which:

Fig. 1 is a top plan view of a device constructed in accordance with my invention;

Fig. 2 is a side elevational view of the device illustrated in Fig. 1;

Fig. 3 is a view taken substantially on the line 3—3 on Figure 1;

Fig. 4 is a sectional view taken substantially on the line 4—4 on Figure 3;

Fig. 5 is a sectional view taken substantially on the line 5—5 on Figure 3;

Fig. 6 is a view partly in elevation and partly in section depicting the supporting and guiding roller employed at the rear end of the machine;

Fig. 7 is a fragmental view depicting the front end of the device looking in the opposite direction from Figure 2 and depicting the control mechanisms employed in the device;

Fig. 8 is a sectional detail view depicting a comb arrangement employed in the device; and Fig. 9 is a detail view depicting a protecting device employed in the device.

In the drawings, wherein a preferred embodiment of my invention is illustrated, 10 indicates the main frame of my device which is preferably substantially rectangular in form. On the frame 10 adjacent the forward ends in the elongated extent thereof suitable bearings 11 are provided which have shafts 12 journalled therein. Mounted on the shafts 12 are downwardly depending arms 13 which are bifurcated at their forward ends and which are adapted to receive rollers 14 that are mounted on shafts 15 in the bifurcated portions of the arms 13. As best illustrated in Figs. 3 and 5, adjacent the pivoted connection of the arms 13 and on the inner side thereof, suitable bosses 16 are provided. On the side of the device opposite that illustrated in Figure 2, a sleeve 17 is journalled in the frame 10 and on the inner end of this sleeve 17 is a cam 18 which is preferably eccentric in shape and which is adapted to bear against the upper flat side of the bosses 16. A rod 19 extends through the sleeve 17 and has an end thereof suitably supported on the opposite side of the machine and this end is provided with a cam 20 which is adapted to bear against the upper side of the boss 16 provided on the arm 13. It is, therefore, apparent that the cams 18 and 20 may be independently adjusted and since these cams are eccentric in form it is apparent that they may dispose the arms 13 in different positions and thus vary the position of the wheels 14 and therefore, the transverse angular inclination of the frame 10. An upwardly extending arm 21 is provided on the sleeve 17 and an upwardly extending arm 22 is provided on the end of the rod 19 and these arms are best depicted in Figs. 5 and 7. Adjacent the forward end of the device in a position to be described more fully hereinafter, two levers 23 and 24 are provided which have segments 25 and 26 co-operating therewith and the levers include usual latching arrangements generically indicated by 27 in the drawings, which are adapted to selectively engage the teeth on the segments 25 and 26. The levers 23 and 24 include portions which extend below the bearings therefore, and a link 28 extends between the arm 22 and the depending portion of the lever 23. A link 29 extends between the depending portion of the lever 24 and the arm 21. It is, therefore, apparent that by varying the position of the levers 23 and 24 the relative positions of the cams 18 and 20 may be adjusted, which will result in the adjustment of the machine hereintofore described.

At the rear end of the main frame 10 a turntable plate 30 is provided, which is connected thereto by the turn-bolt construction, generically indicated by 31. A substantially U-shaped bracket 32 is connected to the turn-bolt construction 31 and includes a round portion 33 adapted to co-operate with the round table 30 so as to facilitate the turning of the bracket 32 relative to the main frame 10. The ends of the arms of the bracket 32 are provided with bearings 34 and 35 in which a shaft 36 is journalled and this shaft is preferably held against rotation. Co-operating drums 37 and 38 are provided which include bearing portions such as 39 that are adapted to be rotatably disposed on the shaft 36 and which include projecting portions 40 on which a spur gear 41 is mounted, it being understood that the construction inside the drums 37 and 38 is substantially similar but oppositely disposed. Supported on the shaft 36 in the drum 37 is a motor 42, and a motor 43 is similarly disposed in the drum 38. The motors 42 and 43 have pinions such as 44 provided thereon which are adapted to mesh with the spur gears 41. When the device is arranged such that the shaft 36 extends at right-angles to the normal course of travel of the machine, and when an equal amount of power is supplied to the motors 42 and 43 the drums 37 and 38 are operated in unison, and thus the machine is propelled over the ground. From the foregoing description it is apparent that the main frame of the machine is supported on the wheels 14 and the drums 37 and 38.

Depending from the main frame 10 are suitable brackets 45 which are provided on each side of the machine at suitable intervals. These brackets 45 have secured to their lower ends angle-irons 46 which have the flanges thereof directed inwardly toward each other. Secured to the angle-irons 46, adjacent the forward ends of the machine, is a stationary picker structure generically indicated by 47. The picker structure 47 includes a solid portion 48 which is disposed adjacent the forward end of the angle-irons 46 and which is suitably connected thereto. Extending forwardly from the solid portion 48 and, as illustrated in Fig. 3, protruding thereabove, are spaced apart fingers 49 which have a bracing strip 50 extending therethrough adjacent the lower edges thereof so as to impart rigidity thereto. These picker fingers 49 are associated with the rest of the machine in such a relative position that they will tend to travel such that the upper edges thereof will be disposed just below the surface of the ground being traversed by the machine. Secured to the frame 10 adjacent the forward end of the device are side plates 51 and 52 which have the lower ends thereof connected to the upper edges of the outside of the fingers 49 and this is clearly illustrated in Figure 3.

As best illustrated in Figure 2, adjacent the forward end of the main frame 10, suitable bearings such as 53 are provided in which a shaft 54 is journalled. A drum 55 includes end walls 56 which connect the periphery thereof to the hub 57 that is disposed around the shaft 54. In spaced apart relation to the shaft 54, is a shaft 58 which is journalled in bearings 59 provided on the main frame 10. As best illustrated in Figure 1, pulleys 60 and 61 are mounted on the shaft 59 one each side of the frame 10. A belt 62 is directed around the pulley 60 and the drum 55, and a belt 63 is directed around the pulley 61 and the drum 55. As illustrated in Figure 3, a gear 64 is mounted on the shaft 58 which is connected to a pinion 65 to which power is supplied in a manner to be set forth hereinafter and the pulleys 60 and 61 are adapted to be fixedly connected to the shaft 58 so as to be rotated therewith, and the pinion 65 rotates the gear 64 which is also fixed on the shaft 58. It is therefore apparent that the belts 62 and 63 will be driven which will cause said belts to travel around the drum 55 and the pulleys 60 and 61. At suitable intervals on the belts 62 and 63, members 66 are connected which are adapted to extend between the belts as best illustrated in Figure 4. These members 66 include a plurality of upwardly opening slots 67 in which the various fingers 68 are mounted on a shaft 69a. The fingers 68 comprising the movable picker 70 are adapted to be pivoted about the shaft 69a. As best illustrated in Figure 3, the fingers 68 include an outwardly extending portion 71 and an inturned portion 72 which is the portion journalled in the openings 67. At the juncture between the portions 71 and 72, a rod 73 extends through the various fingers 69 and connects these fingers together such that they will act as a unit. It is apparent that the movable pickers 70 are carried around the machine by the belts 62 and 63.

As has been stated hereintofore, gears 64 are provided on the shaft 58 which are adapted to mesh with the pinion 65. As best illustrated in Figure 4, the pinions 65 are adapted to be mounted on the shaft of the motor 74 which is preferably an electric motor and which is driven by power derived from a source of supply to be described more fully hereinafter. It is apparent that the motor 74 controls the operation of the pulleys 60 and 61 and therefore the belts 62 and 63, and consequently, the movable pickers 70. The movable pickers 70 which are disposed on the portions of the belts 62 and 63 which are disposed toward the ground ride along on the flanges 75 of the angle-irons 46 which are arranged such that, as illustrated in Figure 3, the movable pickers 70 will move into relation with the stationary pickers 47 in a manner such that they will slide over the stationary portion 48 and the upper edge of the movable pickers 70 is adapted to be substantially parallel with the upper edge of the stationary pickers 47 when said pickers move into operative position as is illustrated clearly in Figure 3. The pickers 70 are arranged at intervals such that as one movable picker 70 is leaving the stationary picker 47, the succeeding picker 70 will be entering said stationary picker 47, it being understood that the arm 69 of the movable picker 70 will move between the arms 49 of the stationary picker 47 and this is best illustrated in Figure 1.

Formed as continuations of the portion 72 of the arms 69 are cam shoes 76. These cam shoes are offset from alignment with the remaining portions of the arms 69 for a purpose to be made apparent presently. As pickers move along the flanges 75 and move into the position shown as being occupied by the picker 70a, the shoes 76 of this picker engage the periphery of the drum 55 and they are therefore cammed down into the position depicted as being occupied in Figure 3 by the fingers 69 of this picker 70a. As the belt 62 continues to operate, the movable picker 70a will move from engagement with the stationary picker 47 and the picker 70b will move into the position occupied by the picker 70a and the picker 70a will then have assumed the position shown as being occupied by the picker 70c. Continued movement of the belts 62 and 63 will cause the picker in the position 70c to move such that the weight of the arms 69 thereof will overcome the weight of the portions of said pickers on the other side of the pivots 67 thereof and therefore, the picker will fall into the position depicted as being occupied by the pickers 70d. The outside blades of the picker will strike the belts 62 and 63 and at the points that these blades 69 will strike the belts 62 and 63 suitable metallic plates 77 (Fig. 9) will be provided on the belts so as to prevent injury thereto. The portions 76 of the picker 70 will be prevented from engaging the belts 62 and 63 by reason of the fact that these portions 76 are offset from alignment with the arms 69, and the arms 69 at the side of the machine in the direction in which the opposite portions extend are not provided with these offset portions and this prevents these portions 76 from engaging the belts.

Adjacent the shaft 58, side plates 78 and 79 are secured to the main frame 10 and disposed in spaced relation to the pulleys 60 and 61 and supported between the plates 78 and 79, is a cover plate 80 which is arranged such that it properly guides the movable picker 70a around the pulleys 60 and 61 as is illustrated best in Figure 3. Suitable rails 81 and 82 extend between the side plates 78 and 51 and 79 and 52, respectively, and as best illustrated in Figure 5, these plates are tapered on their inner side so as to facilitate the proper positioning of the pickers 70 when they fall into the position shown as being occupied by the picker 70d.

Disposed between the sections of the main frame 10 and arranged so as to have its upper end disposed adjacent the periphery of the drum 55, is a receiving trough 83 which is provided with side walls 84 and 85. The bottom of the receiving trough 83 is preferably provided with slots 86 which extend longitudinally thereof from points adjacent each end thereof and suitable reinforcing strips 87 (Fig. 3) extend thereacross. A substantially triangular guiding member 88' is disposed adjacent the delivery end of the trough 83 and has the apex thereof disposed at substantially the midpoint of said trough and this triangular guiding member serves to deflect the picked up objects into troughs 88 and 89 which extend along the sides of the device above the channel portions of the frame 10 as best illustrated in Figs. 1 and 4. It is apparent that when the movable pickers move through the stationary pickers and as they move from engagement therewith, objects of a size less than the spaces between the teeth 69 of these pickers will fall therebetween and therefore, these spaces are of a size such that they will prevent the passage of the picked up objects which for the purpose of description will be called prunes. As the pickers 70 move into the position shown as being occupied by the picker 70c these prunes collect above the portions 72 of the arm 69 and also ride on the periphery of the drum 55. Continued movement caused these picked up prunes to roll from the periphery of the drum 55 onto the receiving trough 83 from whence they pass into the troughs 88 and 89.

As best illustrated in Figs. 1, 2 and 4 depending brackets 90 and 91 extend downwardly from the main frame 10 and include foot portions 92 and 93 which extend outwardly relative to the machine. These brackets 91 and 92 are positioned at spaced apart intervals along the sides of the machine as best illustrated in Figure 2. Mounted on the foot portions 92 and 93 are running boards 94 and 95 on which operatives stand as the machine is in operation and these operatives push the prunes in the troughs 88 and 89 therethrough, and at the same time inspect the prunes so as to remove the spoiled or unfit ones. The troughs 88 and 89 terminate in a receiving portion 96 which extends across the rear side of the machine in the manner best illustrated in Figure 1 and a platform 97 extends across the rear side of the machine between the running boards 94 and 95. A downwardly extending wall portion is provided which extends between the bottom of the receiving portion 96 and the platform 97. This wall portion is indicated by 98 in the drawings. The wall portion 98 is adapted to serve as a stop for the receiving boxes 99 which are adapted to be mounted below the discharge openings 100 which are provided adjacent the rear end of the receiving portion 96. Arranged below the discharge openings 100 are directing spouts 101. Mounted adjacent the discharge ends of the delivery spouts 101 are passage controlling plates 102 which are pivotally connected to the delivery spouts 101, as indicated at 103. The passage controlling plates 102 are arranged so as to be counterbalanced and operating handles 104 (Figure 1) extend outwardly therefrom. By moving the handles 104 upwardly, prunes passing through the openings 100 and the delivery spouts 101 may be directed into the portion of the receiving boxes 99 juxtaposed the wall 98 and by moving these handles 104 downwardly the prunes passing through the openings 100 and spouts 101 may be directed to the opposite side of the receiving boxes 99. It is to be understood that the prunes which pass through the openings 101 will have been thoroughly inspected by the operatives standing on the running boards 94 and 95 and the platform 97 and all defective prunes will have been thrown out as well as dirt and other foreign matter collected by the pickers.

Mounted adjacent the forward end of the device and on the side on which the levers 23 and 24 are provided and arranged so as to be disposed therebelow and carried from the main frame 10 is the operator's platform 105. The levers 23 and 24 are disposed such that the operator standing on the platform 105 will have ready access thereto.

Mounted adjacent the platform 105 is a lever 106 which includes a portion 107 that extends below the pivot point 108 thereof. A tooth segment 109 is provided which is adapted to co-operate with the latching device 110 provided on the lever 106. Connected to the lever 106 above its pivot point 108 is a connecting member such as a cable 111 and connected to the portion 107 of the lever 106 is a connecting member such as a cable 112. As is illustrated best in Figure 1, the cable 111 is directed around a sheave 113 which is carried by the main frame 10 and extends across the machine to a sheave 114 which is suspended from the main frame 10 on the side of the machine opposite from the sheave 113. Disposed on the same side of the machine as the sheave 114 is a sheave 115 and the cable 111 is directed around this sheave. Extending outwardly and forwardly from the member 30 is an arm 116 and the end of the cable 111 is connected thereto. The end of the cable 112 opposite that connected to the portion 107 is connected to the arm 116 opposite the connection of the cable 111.

A sheave 117 is mounted on the main frame 10 in alignment with and on the side opposite to the sheave 115 and the cable 112 is directed around this sheave as well as around the sheave 118 (Figures 1 and 7). It is therefore apparent that by rocking the lever 106 about its pivot 108 the arm 116, and therefore, the member 32 may be moved relative to the longitudinal axis of the device and therefore, the shaft 36 may be disposed at an angle to this longitudinal axis.

The above mentioned mechanisms are utilized to steer the apparatus and this is accomplished in the following manner. Mounted on the main frame 10, preferably above the drums 37 and 38 is a suitable power supplying mechanism such as the internal combustion engine 119 which is adapted to drive a dynamo electric machine 120. The dynamo electric machine is adapted to supply current to the motors 42 and 43 through the controller 121 that is mounted on the platform 105. When the lever 106 is moved so as to dispose the shaft 36 at an angle to the longitudinal axis of the device it is apparent that the drums 37 and 38 will be arranged at an angle to the normal course of travel of the device and therefore, the device will tend to turn about the turn bolt 31. Due to the relative angular positioning of the drums 37 and 38 it is apparent that the drum which is disposed on the side opposite that on which the turn is to be made will tend to rotate faster than the drum on the inside or the side on which the turn is to be made. This side drum will have a greater load impressed thereon since the turning will be made thereon, and therefore, a differential action will result for due to the greater load impressed upon the motor driving the drum on the inside this motor will tend to slow down and since the load will be lighter on the outer drum the motor driving this drum will tend to speed up and which in turn will speed up the drum and this will facilitate the turning of the device. The foregoing describes the manner in which the mechanism is steered.

In the event the device was operating over uneven ground or ground extending at an angular inclination, or in the event it is required that the stationary pickers 47 be caused to enter the ground to a greater depth manipulation of the levers 23 and 24 in the manner hereintofore described will permit the raising or lowering of the wheels 14 either together or independently of each other, which will cause the pickers to be in proper position.

It is apparent that at times it will be desirous to operate the movable pickers 70 at a greater rate of speed than at other times and in order to accomplish this a controller 122 is provided on the platform 105, which is arranged in the circuit between the motor 74 and the dynamo electric machine 120. It is therefore apparent that by proper adjustment of the controllers 121 and 122, the relative speed with which the motors 42 and 43 and the motor 74 will be operated may be controlled. It is also apparent that the device is arranged such that the object picked up may be thoroughly inspected before passage into the receiving boxes which is obviously an advantageous arrangement.

It is manifest that during operation the device will pass over the ground on which the prunes to be picked have fallen and, therefore, the prunes which are in the path of travel of the device but not in the path of the pickers must be moved from said path to prevent crushing thereof. In order to accomplish this, I support from the side of the machine in the manner best illustrated in Figures 1 and 2, comb devices which are indicated by 123 and 124 in the drawings, the contour of the comb device 124 in Figure 1, depicting the general formation of these comb devices in plan view. In Figure 8, I illustrate a detail of this comb device, which is shown as including a rail member 125 which has a plurality of teeth 126 (also shown in Figure 2) depending therefrom, which effectively direct all material in front of the machine to the sides thereof so as to prevent the machine passing thereover.

It is apparent from the foregoing, that I have provided a machine which will effectively pick up objects such as fruit and nuts from the ground and one which will be arranged such that it will be of relatively restricted height in order that it may pass under trees and the like and one which will be arranged such that defective articles picked up may be removed so as to prevent their passage into the receiving boxes which are arranged such that they may be removed and replaced by empty boxes when they become filled.

While I have illustrated and described the preferred form of construction for carrying my invention into effect, this is capable of variation and modification, without departing from the spirit of the invention. I, therefore, then do not wish to be limited to the precise details herein set forth but desire to avail myself of such variation and modifications as come within the scope of the appended claims.

Having thus described my invention, what I claim as new and desire to protect by Letters Patent is:

1. In a device of the class described, a main frame, means for supporting said main frame for movement over the ground, means for rotatably supporting a drum at the forward end of said main frame, means for supporting pulleys on said main frame in spaced relation to said drum, co-operating endless belts directed around said drum and said pulleys, supporting members mounted on at spaced apart intervals and extending between said belts, picker members comprising a plurality of spaced apart arms pivotally mounted on said supporting members, a stationary picker member mounted at the forward end of said machine, said stationary picker member comprising a plurality of spaced apart arms, said spaced apart arms on said movable picker members having offset portions thereon adapted to engage the periphery of said drum whereby said arms of said movable picker members may be disposed in the spaces between the arms of said stationary picker member, and means for operating said endless belts whereby said movable picker members may be successively moved into and from engagement with said stationary picker.

2. In a device of the class described, a main frame, means for supporting said main frame for movement over the ground, a stationary picker member mounted at the forward end of said device, means for successively moving a plurality of movable picker members into and from association with said stationary picker, troughs adapted to receive the material picked up by said movable pickers as said movable pickers are moved from association with said stationary picker, and means disposed at the rear end of said machine adapted to receive the material from said troughs, said last named means having discharge openings therein through which said material may be passed into collecting members carried at the rear end of said device.

3. A picking or gathering machine comprising a frame, means for supporting said frame for movement over the ground, rotatable means mounted in said frame, cooperating endless belts movable over said rotatable means in parallel relation with the ground and in a clockwise direction as viewed from the left hand side of the machine when, assuming the machine to be seen from the rear, a plurality of stationary gathering fingers or tines carried by said frame at the front end of the machine and spaced apart from each other, and a plurality of movable gathering fingers pivotally carried by said belts and including portions movable parallel to and between said tines as said belts reach the forward end of their travel whereby fruit or other objects may be picked up from the surface of the ground by said movable fingers and carried upwardly and toward the rear of the machine to be dumped into means provided for the reception of said objects.

4. A picking or gathering machine comprising a frame, means for supporting said frame for movement over the ground, rotatable means mounted in said frame, cooperating endless belts movable over said rotatable means in parallel relation with the ground and in a clockwise direction as viewed from the left hand side of the machine when, assuming the machine to be seen from the rear, a plurality of stationary gathering fingers or tines carried by said frame at the front end of the machine and spaced apart from each other, a plurality of movable gathering fingers pivotally carried by said belts and including portions movable parallel to and between said tines as said belts reach the forward end of their travel whereby fruit or other objects may be picked up from the surface of the ground by said movable fingers and carried upwardly and toward the rear of the machine to be dumped into means provided for the reception of said objects, and means for keeping said portions of said movable fingers in parallel relation with said tines until said portions reach the furthest forward point of movement between said tines so that objects may be transferred from said tines to said movable fingers.

5. A picking or gathering machine comprising a frame, means for supporting said frame for movement over the ground, rotatable means mounted in said frame, cooperating endless belts movable over said rotatable means in parallel relation with the ground and in a clockwise direction as viewed from the left hand side of the machine when, assuming the machine to be seen from the rear, a plurality of stationary gathering fingers or tines carried by said frame at the front end of the machine and spaced apart from each other, a plurality of movable gathering fingers pivotally carried by said belts and including portions movable parallel to and between said tines as said belts reach the forward end of their travel whereby fruit or other objects may be picked up from the surface of the ground by said movable fingers and carried upwardly and toward the rear of the machine to be dumped into means provided for the reception of said objects, means for keeping said portions of said movable fingers in parallel relation with said tines until said portions reach the furthest forward point of movement between said tines so that objects may be transferred from said tines to said movable fingers, and means for guiding said movable fingers in their travel with said belts so that said portions of said movable fingers will be disposed parallel to said tines when traveling toward the forward end of said machine.

6. A picking or gathering machine comprising a frame, means for supporting said frame for movement over the ground, rotatable means mounted in said frame, cooperating endless belts movable over said rotatable means in parallel relation with the ground and in a clockwise direction as viewed from the left hand side of the machine when, assuming the machine to be seen from the rear, a plurality of stationary gathering fingers or tines carried by said frame at the front end of the machine and spaced apart from each other, a plurality of movable gathering fingers pivotally carried by said belts and including portions movable parallel to and between said tines as said belts reach the forward end of their travel whereby fruit or other objects may be picked up from the surface of the ground by said movable fingers and carried upwardly and toward the rear of the machine to be dumped into means provided for the reception of said objects, means for keeping said portions of said movable fingers in parallel relation with said tines until said portions reach the furthest forward point of movement between said tines so that objects may be transferred from said tines to said movable fingers, and means for guiding said movable fingers in their travel with said belts so that said portions of said movable fingers will be disposed parallel to said tines when traveling toward the forward end of said machine, said movable fingers being pivoted so as to dump themselves rearwardly when beginning their travel toward the rear of the machine.

7. In a picking machine, a frame mounted for travel over ground, an endless carrier mounted on said frame and having a lower run disposed in substantially parallel relation with and a short distance above the ground, means for driving said carrier, a stationary gathering member connected with said frame and mounted just forwardly of said endless carrier and comprising a plurality of forwardly extending spaced gathering fingers or tines, a plurality of spaced picking fingers mounted on said carrier and having free outer ends movable longitudinally of and between said tines until said fingers are substantially aligned with said tines transversely of said frame, said carrier being constructed to thereafter cause said fingers to move upwardly away from said tines.

8. In a picking machine, a frame mounted for travel over the ground, an endless carrier mounted on said frame and having a lower run disposed in close relation to the ground, means for driving said carrier, a stationary gathering member connected with said frame and mounted forwardly of said endless carrier and comprising a plurality of forwardly extending spaced gathering fingers or tines, a plurality of movable picking fingers mounted on said endless carrier and having free outer ends movable between said tines, means for guiding said movable fingers in parallel relation with said tines until said fingers are substantially aligned with said tines transversely of said frame and means for thereafter causing said fingers to move upwardly and inwardly toward said carrier.

9. In a picking machine, a frame mounted for travel over the ground, a carrier comprising a pair of spaced endless elements trained over suitable supporting means, said endless elements having lower runs disposed in close relation to the ground and having upper runs spaced a considerable distance above said lower runs, a series of widely spaced transverse rods connecting said endless elements, means for driving said carrier in such manner that said lower runs travel forwardly, a stationary gathering member connected with said frame and mounted just forwardly of the lower runs of said endless members, said gathering member comprising a plurality of forwardly extending spaced gathering fingers or tines, a plurality of sets of movable picking fingers mounted on said carrier, each set comprising a series of spaced fingers mounted on one of said rods, means for guiding said movable fingers longitudinally of and between said tines at the lower run of said carrier until said fingers are substantially aligned with said tines transversely of the frame, means for thereafter causing said fingers to move upwardly and inwardly toward said carrier whereby articles will be transferred from said tines to said fingers, elevated and dumped at the upper run of said carrier, and means disposed below the upper run of said carrier for receiving articles dumped between said endless members.

10. The structure set forth in claim 9 and means for conveying articles dumped in said receiving means outwardly between the runs of said carrier and then rearwardly of said frame.

11. In a picking machine, a frame, revoluble supporting means for the rear of said frame, a pair of wheels for supporting the front of said frame, adjustable connections between said wheels and said frame for varying the height of the front of said frame relatively to the ground, an endless carrier mounted on the forward portion of said frame and having a lower run disposed in close relation to the ground, means for driving said carrier, a stationary gathering member connected with said frame and mounted forwardly of said endless carrier and comprising a plurality of forwardly extending spaced gathering fingers or tines adapted to engage the ground, a plurality of movable picking fingers mounted on said endless carrier and having free outer ends movable between said tines, means for guiding said movable fingers in parallel relation with said tines until said fingers are substantially aligned with said tines transversely of said frame and means for thereafter causing said fingers to move upwardly and inwardly toward said carrier, and means controllable from said frame for instantly effecting the adjustment and height of the forward end of said frame and consequently the depth of said tines in the ground.

12. In a picking machine, a frame mounted for travel over the ground, an endless carrier mounted on said frame and having a lower run disposed in close relation to the ground, means for driving said carrier, a stationary gathering member connected with said frame and mounted just forwardly of the lower run of said carrier and comprising a plurality of forwardly extending spaced gathering fingers or tines, said carrier being trained about a revoluble member at its forward portion and a plurality of spaced picking fingers pivotally mounted on said carrier and having free outer ends movable longitudinally of and between said tines until said fingers are substantially aligned with said tines transversely of said frame, said fingers carrying short camming arms at their inner ends adapted to be affected by the contour of said revoluble member to swing said fingers upwardly and inwardly toward said carrier after said fingers pass around said revoluble member.

13. In a picking machine, a frame, revoluble means for supporting the rear of said frame, a pair of wheels for supporting the forward end of said frame, said wheels being disposed at the sides of the frame, a carrier mounted at the forward portion of said frame and having a lower run disposed in close relation to the ground, between said wheels, means for driving said carrier, a stationary gathering member connected with said frame and mounted forwardly of said endless carrier comprising a plurality of forwardly extending spaced gathering fingers or tines, a plurality of spaced picking fingers mounted on said endless carrier and having free outer ends movable longitudinally of and between said tines until said fingers are substantially aligned with said tines transversely of said frame, means for thereafter causing said fingers to move upwardly and inwardly toward said carrier, and article deflecting means or combs at the sides of said frame diverging rearwardly from points adjacent the end tines for diverting articles from the path of said wheels.

ARTHUR J. BEHLING.